(12) United States Patent  
Aoki et al.

(10) Patent No.: US 7,476,334 B2  
(45) Date of Patent: Jan. 13, 2009

(54) PHOSPHOR AND PLASMA DISPLAY UNIT

(75) Inventors: Masaki Aoki, Osaka (JP); Yumi Kondo, Osaka (JP); Kazuhiko Sugimoto, Kyoto (JP); Hiroshi Setoguchi, Osaka (JP); Junichi Hibino, Kyoto (JP); Yoshinori Tanaka, Osaka (JP); Teppei Hosokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 634 days.

(21) Appl. No.: 10/526,555

(22) PCT Filed: Apr. 21, 2004

(86) PCT No.: PCT/JP2004/005692

§ 371 (c)(1),  
(2), (4) Date: Mar. 4, 2005

(87) PCT Pub. No.: WO2004/094558

PCT Pub. Date: Nov. 4, 2004

(65) Prior Publication Data

US 2006/0108923 A1 May 25, 2006

(30) Foreign Application Priority Data

Apr. 22, 2003 (JP) .............................. 2003-116874

(51) Int. Cl.  
*C09K 11/08* (2006.01)  
*C09K 11/59* (2006.01)

(52) U.S. Cl. ............................. 252/301.4 R; 428/403; 428/404; 313/582; 313/584; 313/486

(58) Field of Classification Search .......... 252/301.4 R–301.6 F; 428/403, 404; 313/582, 584, 486  
See application file for complete search history.

(56) References Cited

U.S. PATENT DOCUMENTS

| | | | | |
|---|---|---|---|---|
| 5,289,081 | A | * | 2/1994 | Tamatani et al. ............ 313/487 |
| 5,744,233 | A | * | 4/1998 | Opitz et al. .................. 428/328 |
| 5,985,175 | A | * | 11/1999 | Fan et al. ............... 252/301.4 R |
| 7,232,530 | B2 | * | 6/2007 | Kawamura et al. ..... 252/301.4 F |
| 7,288,889 | B2 | * | 10/2007 | Kawamura et al. ........... 313/582 |

(Continued)

FOREIGN PATENT DOCUMENTS

JP 6-273425 9/1994

(Continued)

OTHER PUBLICATIONS

Translation for JP 11-86735, Mar. 30, 1999.*  
Translation for JP 2000-285809, Oct. 13, 2000.*  
"Phosphor Handbook" p. 219-220, published by Ohm Co., Ltd.  
J. Koike, "O plus E, No. 195", (Feb. 1996) pp. 98-100.

*Primary Examiner*—C. Melissa Koslow  
(74) *Attorney, Agent, or Firm*—McDermott Will & Emery LLP

(57) ABSTRACT

Disclosed here is a plasma display unit that employs phosphors having an amount of charge controlled close to zero, by which degradation in luminance, color temperature, and charge characteristics can be minimized. A phosphor bearing positive or negative charge is coated with a compound for controlling the amount of charge of the phosphor through a strong chemical bonding, whereby the amount of charge of a phosphor can be suppressed within ±0.01 µC/g. Controlling the amount of charge of phosphors close to zero can keep impurity gases away from the phosphor particle when the panel is in operation, suppressing problems critical to driving a plasma display unit, such as luminance degradation of phosphors, improper alignment of color in panel operation, luminance degradation when the panel displays all white.

15 Claims, 4 Drawing Sheets

U.S. PATENT DOCUMENTS

2004/0043692 A1*  3/2004  Kawamura et al. ............ 445/24
2004/0051440 A1*  3/2004  Sugimoto et al. ........... 313/486

FOREIGN PATENT DOCUMENTS

| JP | 11-86735 | 3/1999 |
| JP | 11-241063 | 9/1999 |
| JP | 2000-285809 | 10/2000 |
| JP | 2000-303065 | 10/2000 |
| JP | 2001-236893 | 8/2001 |
| JP | 2002-93321 | 3/2002 |
| JP | 2002-208355 | 7/2002 |
| KR | 20030013990 | 2/2003 |
| WO | WO 03/025088 | * 3/2003 |
| WO | WO 03/025090 | * 3/2003 |
| WO | WO 03/056596 | * 7/2003 |

* cited by examiner

PHOSPHOR AND PLASMA DISPLAY UNIT

THIS APPLICATION IS A U.S. NATIONAL PHASE APPLICATION OF PCT INTERNATIONAL APPLICATION PCT/JP2004/005692.

TECHNICAL FIELD

The present invention relates to a plasma display unit employing phosphors that emit light by ultraviolet excitation, and the plasma display unit is typically used for the screen of a TV.

BACKGROUND ART

In color display devices employed for image display on computers or TVs, a plasma display unit having a plasma display panel (hereinafter referred to as a PDP) has recently received considerable attention as a color display device with large sized screen but lightweight body due to its low-profile structure.

A PDP displays image in full color by performing an additive color process on red, green, and blue—known as the three primary colors. To realize the full color display, a PDP has phosphor layers that are respectively prepared for emitting red (R), green (G), and blue (B) of the three primary colors. A phosphor layer is formed of phosphor particles. The phosphor particles are excited by ultraviolet rays generated in discharge cells in the PDP, so that visible lights of red, green, and blue are produced.

As the chemical compounds typically used for the phosphors above are, for example, $Zn_2SiO_4:Mn^{2+}$, which is a green emitter with a tendency to be negatively (−) charged; $BaMgAl_{10}O_{17}:Eu^{2+}$, which is a blue emitter with a tendency to be positively (+) charged; and $(Y,Gd) BO_3:Eu^{3+}$, $Y_2O_3:Eu^{3+}$, which are red emitters with a tendency to be positively (+) charged (for example, see *O plus E*, No. 195, pp. 98-100, February 1996).

Each phosphor is manufactured through solid phase reaction—after mixed predetermined material, the mixture is baked at high temperature beyond 1000° C. (for example, see *Phosphor Handbook*, pp. 219-220, Ohm-sha). Because the baking process sinters the phosphor particles, the phosphor particles are crushed to eliminate clotted particles, but are crushed lightly so as not to break the crystallized structure that invites poor luminance. After crushing, the phosphor particles are classified to obtain an average particle diameter for each phosphor particle: preferably, 2-5 μm for the red, and the green phosphors, 3-10 μm for the blue phosphor. The reason why the phosphor particles should be lightly crushed and classified is described below. To form a phosphor layer of a PDP, manufacturers have conventionally employed a screen printing method in which the phosphor particles of each color are processed into paste and the paste is applied by screen printing; and an inkjet applying method in which paste-like phosphor particles are applied with a nozzle (that is introduced in, for example, Japanese Patent Unexamined Publication No. H06-273425). The light crushing and classification can eliminate clotted particles that can cause an uneven application of the phosphor paste or a clogged nozzle in the phosphor paste applying process.

That is, the classified phosphor particles after experienced light crushing offer a uniform particle diameter and particle size distribution, whereby a smooth surface without irregularities can be expected. In forming a phosphor layer, the phosphor particles having smaller, closer to uniformity in size of a particle diameter and closer to a sphere in shape can offer a smoother coating surface. Such desirable particles improve filling density in a phosphor layer; accordingly, increasing luminance efficiency by virtue of increase in emitting surface area of phosphor particles. The advantages above contribute to stable operations in driving a PDP.

On the other hand, a phosphor is an insulant, which is basically formed of a crystal that is stoichiometrically produced from various kinds of elements. The chemical bond of the crystal itself is the ionic bond rather than the covalent bond. A phosphor exhibits different charge characteristics according to electronegativity and the crystal structure of the elements forming the phosphor. Some suggestions about stabilizing the charge characteristics of phosphors have disclosed (see, for example, Japanese Patent Unexamined Publication No. H11-86735, Japanese Patent Unexamined Publication No. 2001-236893, and Japanese Patent Unexamined Publication No. 2002-93321).

A PDP employing the combination of conventional phosphor material has problems below, which are caused by the charge characteristics of each phosphor particle.

Specifically, a PDP employing the conventional combination of $Zn_2SiO_4:Mn^{2+}$ for green; $BaMgAl_{10}O_{17}:Eu^{2+}$ for blue; and $(Y,Gd) BO_3:Eu^{3+}$ or $Y_2O_3:Eu^{2+}$ for red has a pending problem below. Of the phosphors employed above, the surfaces of the blue and the red phosphor particles bear positive (+) charge, having an amount of charge of ranging from +1.2 μC/g to +1.1 μC/g measured by a blow-off charge measuring method, which is a widely used method for measuring an amount of charge of powders). On the other hand, the surface of the green phosphor particle of $Zn_2SiO_4:Mn^{2+}$ bears negative (−) charge, having an amount of charge of −1.5 μC/g measured by the same method. The reason why the surface of the green phosphor particle bears negative charge results from the fact below. Compared to the stoichiometric ratio of zinc oxide (ZnO) to silicon oxide ($SiO_2$) of 2 to 1, the green phosphor of $Zn_2SiO_4:Mn^{2+}$ in the practical use contains the amount of $SiO_2$ has greater than the stoichiometrically determined amount, having a mixture ratio ZnO to $SiO_2$ of 1.5 to 1. The crystal of $Zn_2SiO_4:Mn^{2+}$ contains excessive $SiO_2$ on the surface, and $SiO_2$ is likely to bear negative (−) charge due to a great electronegativity on its physical properties.

Generally, in a PDP having a phosphor layer in which a negatively (−) charged phosphor and a positively (+) charged phosphor coexist, the difference in the charge characteristics introduces variations in the amount of discharge through the repeated PDP driving operations. Due to the variations in the charge characteristics, a PDP can't keep a consistent voltage of address discharge on the application of voltage for display, resulting in discharge failure, such as variations in discharge and no discharge.

The difference in charge characteristics has also a problem in forming the phosphor layer using an inkjet applying method. In the inkjet method, phosphor ink is continuously fed through a narrow nozzle to a barrier rib on the rear substrate. The phosphor ink, which is positively (+) or negatively (−) charged due to the friction caused at ink-jetting, is often launched with a bend, and therefore, the ink cannot be evenly applied on the surface of the barrier ribs. In particular, employing each of the three phosphor ink having difference in charge characteristics makes charge control of the rear substrate difficult, thereby inviting the uneven application of the phosphor ink that spoils the view on the PDP.

In driving a PDP, a 147 nm-ultraviolet ray, which is a resonance line with respect to xenon (Xe), is employed for the excitation source of emission. Because of such a short wavelength and therefore poor permeability of the ultraviolet rays, the excitation occurs at only the surface area of the phosphor.

That is, the surface condition of the phosphor particles is the most susceptible to luminance degradation. The phosphor surfaces bearing positive or negative charge tell that many dangling bonds occur on the surface of the phosphor particles. Such a surface condition easily captures impurity gases including a hydrocarbon-based gas generated in a PDP. The captured impurity gases are decomposed by plasmatic activity in the PDP to create active hydrogen (proton), by which the surface of the phosphor is reduced to non-crystalloid. This is the main factor that leads to luminance degradation. Besides, in aging or driving a PDP, the phosphor surface bearing charge encourages a collision between positive (+) ions, such as $Ne^+$, $Xe^+$, $H^+$, or between negative (−) ions, such as $CH_x^{n-}$ (hydrocarbon-based gas), $O^{2-}$, in discharge plasma, thereby causing crystal destruction. The phosphor surface bearing charge, as described above, can lead to a fatal degradation including luminance degradation of a PDP.

The present invention addresses the problems above. It is therefore the object of the invention to control the amount of charge of the phosphors so that the absolute value of the amount of charge of each phosphor—green, blue, and red—is determined to be at most 0.01 μC/g, preferably, to be zero.

DISCLOSURE OF THE INVENTION

To achieve the aforementioned object, the plasma display panel (PDP) of the present invention has a structure at least formed of a front panel containing a plurality of display electrode pairs disposed on a glass substrate, and a rear panel containing a plurality of address electrodes and a phosphor layer for emitting by discharging. The front panel and the rear panel are oppositely situated so as to form discharge space therebetween, and the display electrode pairs on the front panel and the address electrodes on the rear panel form discharge cells. According to such structured PDP of the invention, surface charge of the phosphor of the phosphor layer is determined to be ±0.01 μC/g or less.

Through the control of the surface charge, the phosphors have almost the same amounts of charge (i.e., nearly zero), thereby providing a consistent address discharge. Accordingly, the amount of charge on the surface of each phosphor are substantially the same. Such an improved surface condition of the phosphor can minimize inconsistent discharge and other discharge failures.

DETAILED DESCRIPTION OF CARRYING OUT OF THE INVENTION

Hereinafter will be described in detail an exemplary embodiment of the present invention.

First, a plasma display unit of the embodiment of the present invention is described with reference to accompanying drawings.

Figure 1:
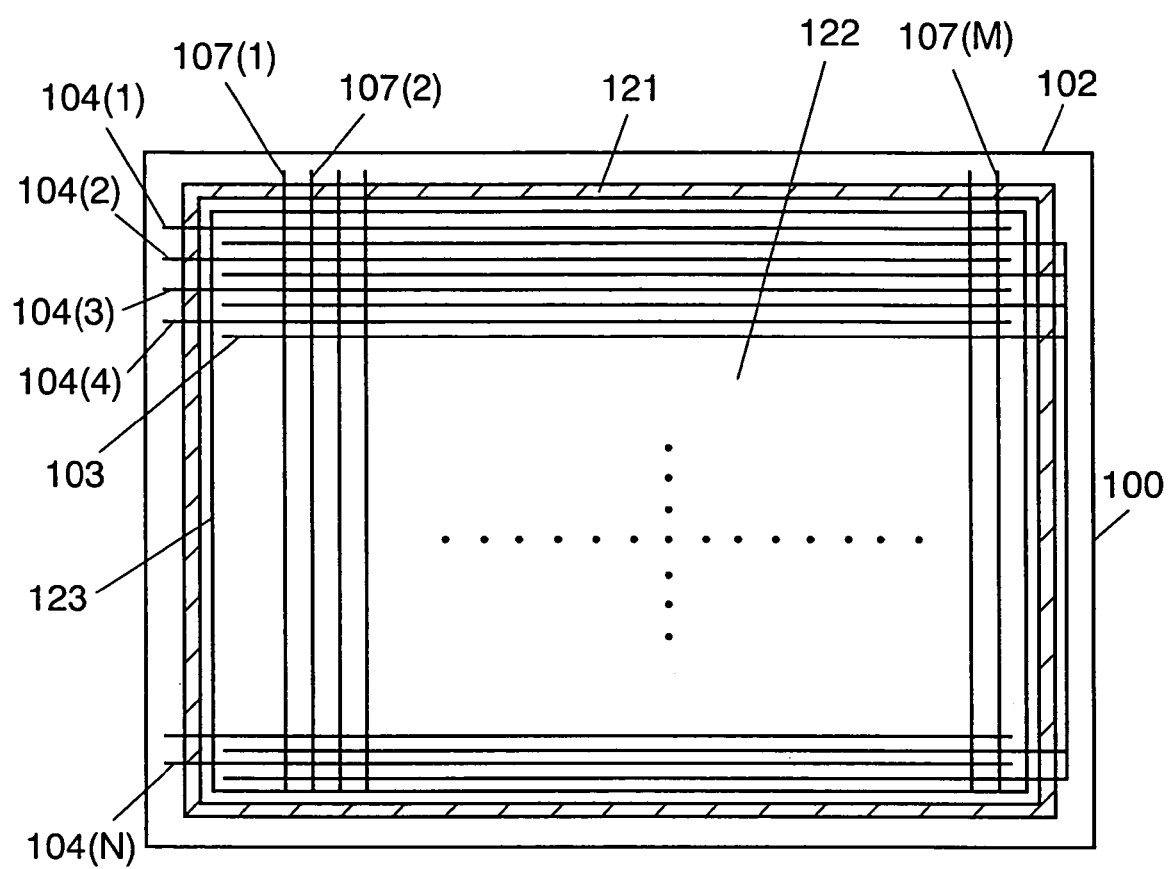
FIG. 1 is a plan view generally illustrating the structure of a PDP, with a front glass plate removed, of an exemplary embodiment of the invention.
Figure 2:
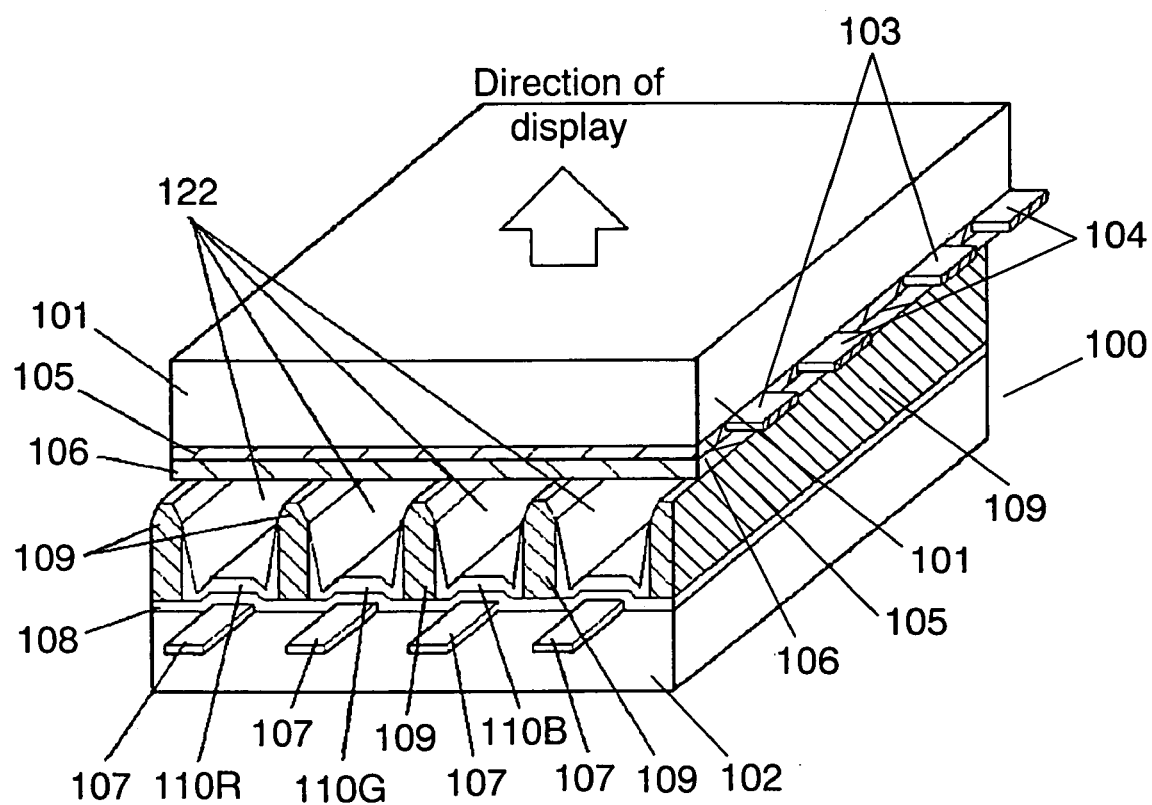
FIG. 2 is a partly sectioned perspective view indicative of the image display area of the PDP of the embodiment.

FIG. 1 is a schematic plan view of plasma display panel (PDP) 100, with front glass substrate 101 removed. FIG. 2 is a partly sectioned perspective view showing image display area 123. In FIG. 1, display electrodes 103 forming the display electrode pairs, display scan electrodes 104, and address electrodes 107 are partly omitted for the sake of clarity. Now will be described the structure of PDP 100 with reference to FIGS. 1 and 2.

In FIG. 1, PDP 100 contains front glass substrate 101 (not shown), rear glass substrate 102, N display electrodes 103, N display scan electrodes 104 (where, a parenthesized N indicates the $N^{th}$ electrode), M address electrode 107 (where, a parenthesized M indicates the $M^{th}$ electrode), and hermetic seal layer 121 indicated by diagonal lines. The PDP has an electrode matrix having a three-electrode structure made of respective electrodes 103, 104, and 107. Discharge cells are formed at the respective intersections of display electrodes 103 and address electrodes 107. Display electrodes 103, display scan electrodes 104, dielectric glass layer 105, and MgO protective layer 106 are, as shown in FIG. 2, disposed on a principle surface of front glass substrate 101. On the other hand, disposed on a principle surface of rear glass substrate 102 are address electrodes 107, dielectric glass layer 108, barrier ribs 109, and phosphor layers 110R, 110G, 110B. The two substrates are sealed with each other so as to form discharge space 122 therebetween. Discharge space 122 is filled with a discharge gas. The PDP structured above is connected to an external driver circuit to complete a plasma display unit.

Figure 3:
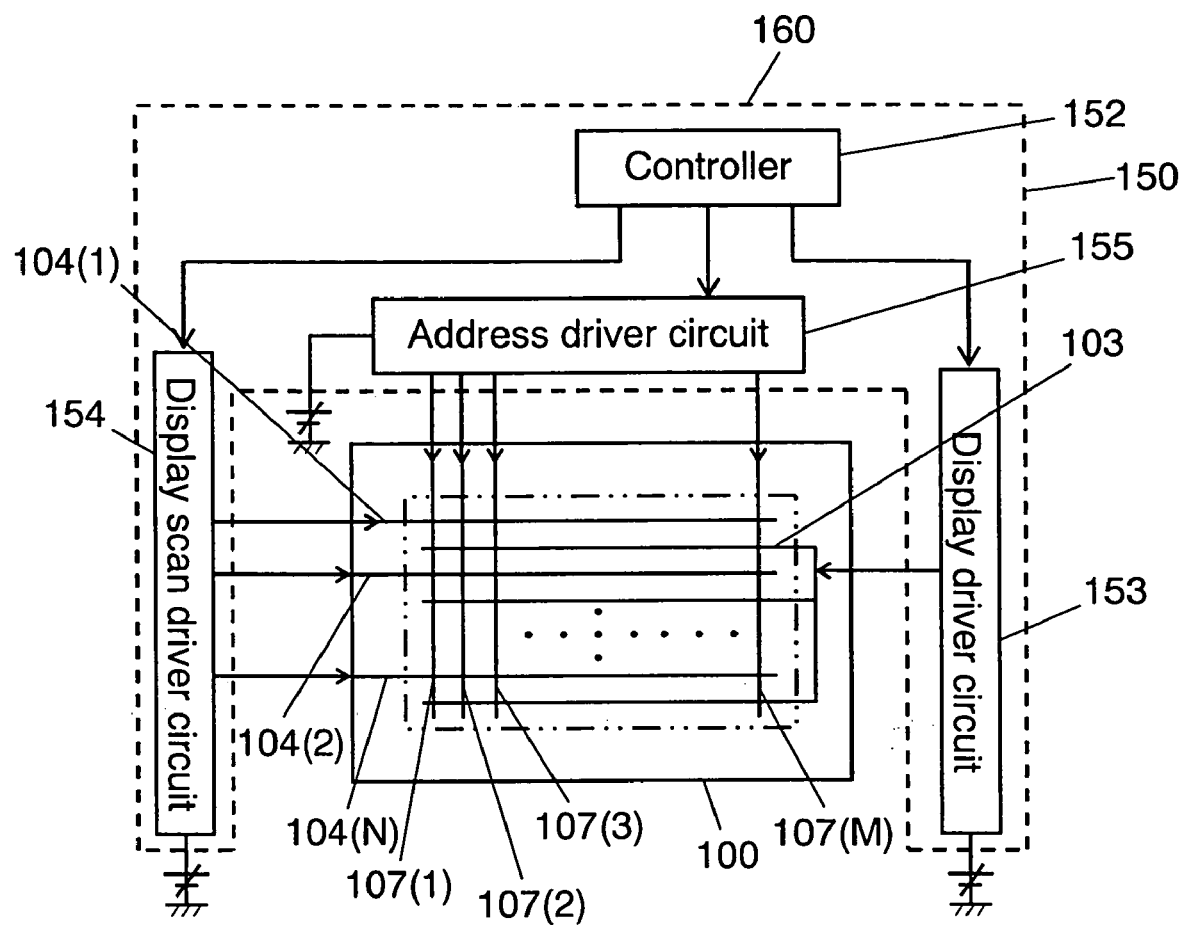
FIG. 3 is a block diagram of the whole structure of a plasma display unit of the embodiment.

FIG. 3 is a block diagram showing the whole structure of plasma display unit 160. Plasma display unit 160 is mainly formed of PDP 100, and driver circuit 150 that contains display driver circuit 153, display scan driver circuit 154, address driver circuit 155, controller 152. In driving operations of plasma display unit 160, according to the control of controller 152, a voltage is applied to each display scan electrode 104 and each address electrode 107 of a cell to be lit for address discharge therebetween. Then, a pulse voltage is applied to display electrode 103 and display scan electrode 104 for sustain discharge. The sustain discharge generates ultraviolet light in the cell. The phosphor layers excited by the ultraviolet light emit light, thereby lighting the cell. In this way, combination of lit and unlit cells of the respective colors produces image on the display.

Now will be described a method of manufacturing PDP 100 with reference to FIGS. 1 and 2.

The description is firstly given on the front panel. On front glass substrate 101, N display electrodes 103 and N display scan electrodes 104 are arranged parallel to each other, like stripes. (In FIG. 2, only two of respective electrodes are shown for simplicity.) Thereafter, the electrodes are covered with dielectric glass layer 105, and further over which, MgO protective layer 106 is formed. Display electrodes 103 and display scan electrodes 104 are made of silver. These electrodes are formed by applying silver paste for electrodes by screen printing and then, the paste is baked. Dielectric glass layer 105 is formed by applying a paste containing lead glass material by screen printing, and baking the paste at a predetermined temperature for a predetermined period of time (e.g. at 560° C. for 20 min.) to obtain a desired thickness (approx. 20 μm). As for the paste containing lead glass material, a mixture of 70 wt % of lead oxide (PbO), 15 wt % of boron oxide ($B_2O_3$), 10 wt % of silicon oxide (($SiO_2$), 5 wt % of aluminum oxide ($Al_2O_3$) and an organic binder (α-terpineol containing 10% of ethyl cellulose dissolved therein) is often used. The aforementioned organic binder contains a resin dissolved in an organic solvent. Acrylic resin can be used as a resin other than the ethyl cellulose, and n-butylcarbitol as an organic solvent. Further, a dispersant—for, example, glyceryl trileate—can be mixed into such an organic binder. MgO protective layer 106 is made of magnesium oxide (MgO). Protective layer 106 is formed into a predetermined thickness (approx. 0.5 μm) by sputtering or chemical vapor deposition (CVD) method.

Now, the explanation turns to the rear panel. First, silver paste is applied to rear glass substrate 102 by screen printing. And then, the paste is baked to form M address electrodes 107 in lines. Next, dielectric glass layer 108 is formed by applying a paste containing lead glass material onto the address electrodes by screen printing. Barrier ribs 109 are made of photosensitive paste containing lead glass material. The paste is applied over the dielectric glass layer for pattern forming by photography method and then the paste is baked. Barrier ribs 109 are thus formed. Barrier ribs 109 divide, in the direction of the lines, discharge space 122 into respective cells (i.e., unit emission area).

Figure 4:
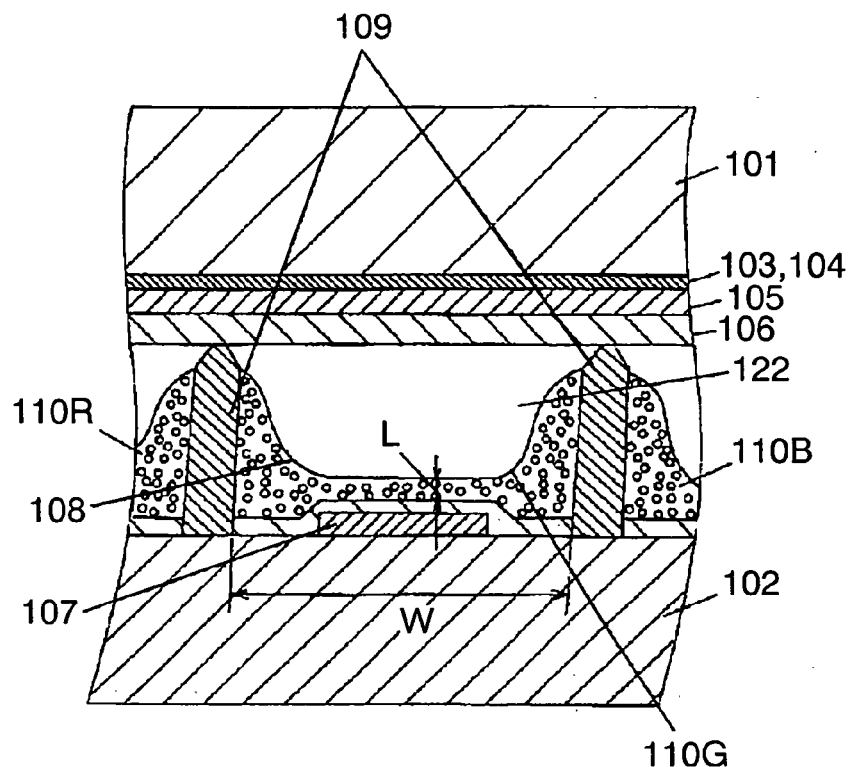
FIG. 4 is a partial sectional view illustrating the structure of the image display area of the PDP of the embodiment.

FIG. 4 is a partially sectional view of PDP 100. As shown in FIG. 4, interval W between barrier ribs 109 is determined to a value ranging from approx. 130 to 240 μm so as to be suitable for a 32-50 in. high definition television (HD-TV). In each groove between barrier ribs 109, phosphor layers 110R for red, 110G for green, and 110B for blue are formed. The amount of charge of each phosphor is controlled ranging −0.01 μC/g to +0.01 μC/g. It is preferable that phosphor layers 110R, 110G, 110B are formed so as to have thickness L in the direction of layer being approx. 8 to 25 times the average diameter of phosphor particles of each color. That is, in order to constantly achieve a certain luminance (emission efficiency) when a phosphor layer is irradiated with an amount of ultraviolet light, the phosphor layer needs to absorb ultraviolet light generated in the discharged space, not allowing the ultraviolet light to pass through the layers. For this purpose, it is desirable that the phosphor layer has a thickness formed of at least eight layered-, preferable, approx. 20 layered-phosphor particles. Having a thickness beyond 20-layered structure almost "saturates" emission efficiency—discharge space 122 cannot be kept a sufficiently large space due to the thickened layer.

Figure 5:
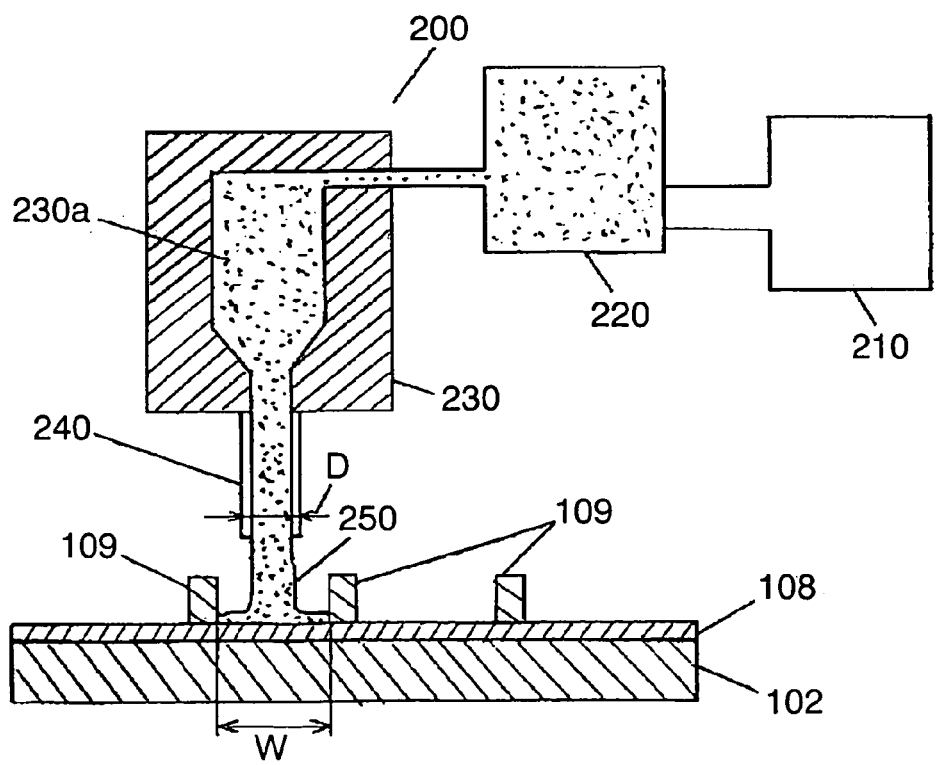
FIG. 5 shows the general structure of an ink dispenser used for forming a phosphor layer in the embodiment.

Here will be described how to form phosphor layers 110R, 110G, and 110B. FIG. 5 is a schematic diagram showing the structure of an ink dispenser used in forming phosphor layers 110R, 110G, and 110B. As shown in FIG. 5, ink dispenser 200 contains server 210, pressure pump 220, and header 230. Phosphor ink 250 is stored in server 210 and is fed, with application of pressure by pressure pump 220, to header 230. Header 230 has ink chamber 230a and nozzle 240. Phosphor ink 250, which was fed to ink chamber 230a with application of pressure, is continuously ejected from nozzle 240. It is desirable that bore diameter D of nozzle 240 is sized at least 30 μm to prevent clogging of the nozzle. It is also desirable that bore diameter D is equal to or smaller than interval W between barrier ribs 109 (approx. 130 to 200 μm) to properly apply the ink into the groove between the barrier ribs. Hence, bore diameter D is usually determined to 30 to 130 μm. Header 230 is structured so as to have a linear movement by a header scanning mechanism (not shown). Continuously ejecting phosphor ink 250 from nozzle 240 while scanning header 230 allows phosphor ink to be uniformly applied into the grooves between barrier ribs 109 on rear glass substrate 102. Viscosity of phosphor ink 250 is kept within the range of 1500 to 50000 centipoises (CP) at a temperature of 25° C. This server 210 also has a mixer (not shown). Mixing prevents precipitation of particles in phosphor ink 250. Header 230 is integrally formed with ink chamber 230a and nozzle 240 by performing machining and electric discharge machining on a metallic material.

Next will be described how to prepare phosphor ink 250. The phosphor ink is prepared by mixing phosphor particles of each color, a binder, and a solvent so that the mixture has a viscosity ranging 1500 to 50000 centipoises (CP). A surface-active agent and a dispersant in an amount of 0.1 to 5 wt % can also be added, as required. Each phosphor particle typically used for the phosphor ink above is: $BaAl_{12}O_{19}:Mn^{2+}$, $Zn_2SiO_4:Mn^{2+}$, $(Y, Gd)BO_3:Tb^{3+}$ for the green phosphor; $Ba_{1-x}MgAl_{10}O_{17}:Eu^{2+}_x$, $Ba_{1-x-y}Sr_yMgAl_{10}O_{17}:Eu^{2+}_x$ for the blue phosphor; and $(Y, Gd)BO_3:Eu^{3+}$, $Y_2O_3:Eu^{3+}$ for the red phosphor. The amount of charge of each phosphor above is controlled ranging from −0.01 μC/g to +0.01 μC/g, which will be explained later in the first and the second embodiments.

As for a binder included in phosphor ink 250, ethyl cellulose or acrylic resin can be used in an amount of 0.1 to 10 wt % of the ink. α-terpineol or n-butylcarbitol can be used as a solvent. Polymers, such as PMA and PVA, can also be used as a binder. As for a solvent, organic solvent, such as diethyleneglycol and methyl ether, can also be used.

Now turning back to manufacturing PDP 100. The front panel and the rear panel described earlier are attached with each other so that the display electrode pairs on the front panel are located orthogonal to the address electrodes on the rear panel. Sealing glass is inserted between the panels along the periphery thereof and baked, for example, at temperatures of approx. 450° C. for 10 to 20 min. to form hermetical seal layer 121 (shown in FIG. 1) for sealing. Next, discharge space 122 is once evacuated to a high vacuum (e.g. $1.1 \times 10^{-4}$ Pa) and filled with a discharge gas, namely, He—Xe or Ne—Xe inert gas at a predetermined pressure. Through the process above, PDP 100 is completed. Such manufactured PDP experiences 5-hour aging process with application of discharge voltage of 185 V and 200 kHz.

Hereinafter will be described how to control the amount of charge of the phosphor of the present invention.

FIRST EXEMPLARY EMBODIMENT

First, the description will be given on preparing $BaAl_{12}O_{19}:Mn^{2+}[xBaO.yAl_2O_3.zMnO.bMO]$ as a green phosphor so as to have a positive charge amount of +0.95 μC/g when the phosphor consists of main materials; where, MO represents a compound to control the amount of charge of the phosphor to be prepared. The aforementioned green phosphor contains barium carbonate ($BaCO_3$), manganese carbonate ($MnCO_3$), aluminum oxide ($Al_2O_3$) as the main materials, and compound MO that contains an element bearing electronegativity of at least 1.5 so that the phosphor to be prepared can maintain the amount of charge close to zero. Oxides can be contained in compound MO are as follows: titanium oxide ($TiO_2$, electronegativity: 1.6); tin oxide ($SnO_2$: 1.9); antimony oxide ($Sb_2O_3$: 1.9); boron oxide ($B_2O_3$: 2.0); germanium oxide ($GeO_2$: 1.7); tantalum oxide ($Ta_2O_5$: 1.5); niobium oxide ($Nb_2O_5$: 1.6); vanadium oxide ($V_2O_5$: 1.6); molybdenum oxide ($MoO_3$: 1.8); silicon oxide ($SiO_2$: 1.6).

Here will be described the preparation of a green phosphor by a solid phase synthesis method. First, mix barium carbonate ($BaCO_3$), magnesium carbonate ($MgCO_3$), aluminum oxide ($Al_2O_3$), manganese carbonate ($MnCO_3$) as a light-emitting substance, and compound MO in a molar ratio of $BaCO_3:MgCO_3:Al_2O_3:MnCO_3:MO=x:y:z:b$ (where, each range is preferably as follows: $0.7 \leq x \leq 1.0$, $5 \leq y \leq 6$, $0.05 \leq z \leq 0.4$, and $0.01 \leq b \leq 0.2$). After that, add a small amount of flux ($AlF_3$) into the mixture. Next, bake the mixture at 1100-1500° C. for 2 hours in the air. After adding a light-crush to the baked material to remove lumps from the materials, bake it at 1200-1500° C. in a $N_2$, or $N_2$—$H_2$ atmosphere. The green phosphor having an amount of charge close to zero is thus obtained.

To produce the phosphor having an amount of charge close to zero, the mixing ratio of the material (i.e., x:y:z:b) has to be properly determined; however, as for amount b of compound MO, actual preparation tells that the phosphor with amount of charge close to zero can be obtained as long as $0.01 \leq b \leq 0.2$. The fact is explained by an action, in which adding compound MO adjusts the amount of charge of a phosphor particle close to zero, accordingly, minimizing the discharge energy of the particle. That is, useless material is naturally eliminated through the preparation process.

Next will be described the preparation of the green phosphor by a hydrothermal synthesis method. In a mixed solution fabrication process, materials of the phosphor, i.e., barium nitrate [$Ba(NO_3)_2$], aluminum nitrate [$Al(NO_3)_3 \cdot 9H_2O$], manganese nitrate [$Mn(NO_3)_2$], and nitrate [$M(NO_3)_n$] that is an oxide for controlling amount of charge are mixed in a molar ratio of x:y:z:b. This mixture is dissolved in an aqueous medium to prepare a mixed solution. Next, add a basic solution, such as ammonia solution, to the hydrate mixed solution prepared above to produce a hydrate. After that, put the hydrate and ion-exchanged water into a capsule made of a corrosion- and heat-resistant material, such as platinum and gold. Then, the capsuled material undergoes hydro-thermal synthesis in a high pressure vessel, using, for example, an autoclave, for 2-20 hours at 100-300° C. with application of pressure of 0.2-10 MPa. Next, the obtained precursor powder is baked at 1200-1500° C. in a $N_2$, or $N_2$—$H_2$ atmosphere. The green phosphor having an amount of charge close to zero is thus obtained. The amount of charge of the phosphor can be changed by controlling each amount of x, y, z, and b.

Next, the description will be given on preparing (Y, Gd)$BO_3$:$Tb^{3+}$[(1-x-y) $Y_2O_3 \cdot xGd_2O_3 \cdot B_2O_3 \cdot yTb_2O_3 \cdot bMO$], which is a green phosphor bearing positive (+) charge when the phosphor consists of main materials. Each range of x, y, and b is preferably determined as follows: $0 \leq x \leq 0.5$, $0.05 \leq y \leq 0.3$, and $0.01 \leq b \leq 0.1$. The main materials of the chemical formula above—yttrium oxide ($Y_2O_3$), gadolinium oxide ($Gd_2O_3$), boron oxide ($B_2O_3$), and terbium oxide ($Tb_2O_3$)—encourage the phosphor to bear positive (+) charge. Therefore, in order to control the amount of charge of the phosphor close to zero, an oxide that tends to bear negative (−) charge due to its great electronegativity should be mixed, with a proper molar ratio, with the main materials. In this case, titanium oxide ($TiO_2$), tin oxide ($SnO_2$), antimony oxide ($Sb_2O_3$), boron oxide ($B_2O_3$), germanium oxide ($GeO_2$), tantalum oxide ($Ta_2O_5$), niobium oxide ($Nb_2O_5$), vanadium oxide ($V_2O_5$), molybdenum oxide ($MoO_3$), and silicon oxide ($SiO_2$) are the preferable compounds. After that, bake the mixture with a small amount of flux, such as $NH_4Cl$, at from 1000° C. to 1400° C. in a $N_2$, or $N_2$—$H_2$ atmosphere. Through the process, the green phosphor having an amount of charge close to zero is obtained.

Next, the description will be given on preparing $Ba_{1-x}Mg_{10}O_{17}$:$Eu_x^{2+}$[(1-x)$BaO \cdot x/2Eu_2O_3 \cdot MgO \cdot 5Al_2O_3 \cdot bMO$], which is a blue phosphor bearing positive (+) charge when the phosphor consists of main materials. The main materials above—barium carbonate ($BaCO_3$), europium oxide ($Eu_2O_3$), magnesium carbonate ($MgCO_3$), aluminum oxide ($Al_2O_3$), and compound MO for controlling the amount of charge of the phosphor are mixed in a molar ratio of 1-x:x/2: 1:5:b (where, $0.03 \leq x \leq 0.3$, $0.01 \leq b \leq 0.2$). As the oxide of compound MO, at least one is selected from the followings: titanium oxide ($TiO_2$), tin oxide ($SnO_2$), antimony oxide ($Sb_2O_3$), boron oxide ($B_2O_3$), germanium oxide ($GeO_2$), tantalum oxide ($Ta_2O_5$), niobium oxide ($Nb_2O_5$), vanadium oxide ($V_2O_5$), molybdenum oxide ($MoO_3$). The mixed powder is baked at, for example, 1350° C. for two hours in a reducing atmosphere containing 5% of hydrogen and 95% of nitrogen, and then the powder is classified. Through the process, with the help of the oxide controlling the amount of charge, $Ba_{1-x}MgAl_{10}O_{17}$:$Eu^{2+}_x$, the blue phosphor having an amount of charge close to zero is thus obtained.

The amount of charge of the phosphor is measured by the blow-off charge measurement. Properly determining the values of x and b contributes to the amount of charge close to zero.

The blue phosphor of $Ba_{1-x-y}Sr_yMgAl_{10}O_{17}$:$Eu_x$, in which Ba is partially replaced with Sr (where, $0.1 \leq y \leq 0.5$), is prepared by the solid reaction method. Like the blue phosphor of $Ba_{1-x}MgAl_{10}O_{17}$:$Eu_x$, the blue phosphor of $Ba_{1-x-y}Sr_yMgAl_{10}O_{17}$:$Eu_x$ is also controlled the amount of charge through the same preparation method.

Next will be described a typical method of oxide coating. In the method, a blue phosphor bearing positive (+) charge that consists of main materials is coated with an oxide bearing negative (−) charge, so that the amount of charge approximates to zero. $Ba_{1-x}MgAl_{10}O_{17}$:$Eu_x$ or $Ba_{1-x-y}Sr_yMgAl_{10}O_{17}$:$Eu_x$ can be used as a blue phosphor in the method.

To achieve a high luminance, the values of x and y should preferably take the ranges: $0.03 \leq x \leq 0.3$, $0.1 \leq y \leq 0.5$. The amount of positive (+) charge of the aforementioned blue phosphors ranges from +0.5 μC/g to +1.3 μC/g. For example, negative charge carrying oxides includes titanium oxide ($TiO_2$), tin oxide ($SnO_2$), antimony oxide ($Sb_2O_3$), germanium oxide ($GeO_2$), tantalum oxide ($Ta_2O_5$), niobium oxide ($Nb_2O_5$), vanadium oxide ($V_2O_5$), molybdenum oxide ($MoO_3$), and silicon oxide ($SiO_2$). As coating material suitable for the phosphor, colloidal solution containing the aforementioned oxides, or water-soluble salt containing metallic element M—among others, β-diketone [$M(C_5H_7O_2)_n$], and alkoxy organometal [$M(OR)_n$], where R represents alkyl group—is preferably used. As the first step of the preparation, mix the main material of the blue phosphor with the coating material containing an oxide above in aqueous solution containing alcohol. Dry the mixture and bake it at 600-1000° C. The surface of the phosphor is coated with the oxide through a chemical bond, whereby the amount of charge of the phosphor is kept close to zero. The amount of charge of the phosphor can be controlled by varying the coating amount of the oxide and the baking temperature.

Next, the description will be given on preparing (Y, Gd)$BO_3$:$Eu^{3+}$[x(Y, Gd)$_2O_3 \cdot B_2O_3 \cdot yEu_2O_3 \cdot bMO$], which is a red phosphor bearing positive (+) charge when the phosphor consists of main materials. First, mix the main materials above—yttrium oxide ($Y_2O_3$), gadolinium oxide ($Gd_2O_3$), boron oxide ($B_2O_3$), and europium oxide ($Eu_2O_3$)—with compound MO for controlling the amount of charge of the phosphor are mixed in a molar ratio of x:y:1:b (where, Y:Gd=65:35). Next, bake the mixture at 1200-1350° C. for 2 hours in the air. After baking, classify the material to obtain the red phosphor. Each value of x, y and b should be determined so that the amount of charge gets close to zero.

Another red phosphor of $Y_2O_3$:$Eu^{3+}$ [$xY_2O_3 \cdot yEu_2O_3 \cdot bMO$], which bears positive (+) charge when the phosphor consists of main materials, is prepared as is the case of the aforementioned phosphor of (Y, Gd)$BO_3$:Eu. Each value of x, y and b should be also determined so that the amount of charge gets close to zero.

SECOND EXEMPLARY EMBODIMENT

Here in the embodiment will be described how to control the amount of charge, taking preparation of a green phosphor of $Zn_2SiO_4:Mn^{2+}[2(1-x)ZnO.2xMnO.ySiO_2.bMO]$. The aforementioned green phosphor bears negative (−) charge of approx. −1.5 μC/g when the phosphor is formed of main materials alone. Therefore, to approximate the amount of charge of the phosphor to zero, a sub material having small electronegativity is added to the main materials. For example, zinc oxide (ZnO), yttrium oxide ($Y_2O_3$), aluminum oxide ($Al_2O_3$), bismuth oxide ($Bi_2O_3$), and magnesium oxide (MgO) can be the compounds to be added. In the preparation, mix the aforementioned compound with the main materials according to a molar ratio determined so as to approximate the amount of charge to zero, and then bake the mixture at 1000-1400° C. in a $N_2$, or $N_2$—$H_2$ atmosphere. The green phosphor having an amount of charge close to zero is thus prepared. Prior to the preparation, each value of x, y and b should be optimized so that the amount of charge gets close to zero. Although adding such a metallic element to the phosphor material is greatly effective in controlling the amount of charge, there has been a worry in which the metallic elements would unfavorably work as an activator for unintended emitting, or work as a killer center that invites poor luminance. However, selecting proper combination of materials can provide an excellent phosphor having an amount of charge close to zero without ill effect.

The descriptions have so far given on a method of controlling the amount of charge in which a compound bearing charges opposite to that of the main materials is added or used as a coating material, that is, a negatively (−) charged compound is used for a positively (+) charged phosphor when the phosphor consists of the main materials, and vice versa.

Other than the method above, the amount of charge of a phosphor can be controlled by adding a compound having an amount of charge of nearly zero, as an additive or a coating material, to phosphor material bearing positive (+)/negative (−) charge when the phosphor consists of main materials. To be more specific, applying an oxide having an amount of charge almost zero, such as manganese oxide ($MnO_2$), chrome oxide ($Cr_2O_3$), boron oxide ($B_2O_3$), and zirconium oxide ($ZrO_2$), to the surface of a phosphor particle to form an extremely thin coat (few nanometers) thereover. Through the coating, the amount of charge of the phosphor can be settled close to zero.

Here will be described an example in which the surface of a phosphor particle of $Zn_2SiO_4:Mn^{2+}$ is coated with boron oxide ($B_2O_3$). The phosphor formed of $Zn_2SiO_4:Mn^{2+}$ bears negative charge of −1.5 μC/g when the phosphor consists of main materials alone, whereas the amount of charge of the coating material of $B_2O_3$ is substantially zero; correctly, used as an additive, the oxide of $B_2O_3$ tends to bear negative (−) charge due to the electronegativity of the B element, on the other hand, used as a coating material, the molecule of $B_2O_3$ has no noticeable characteristics in amount of charge.

In the preparation process, firstly, hydrolyze the phosphor material of $Zn_2SiO_4:Mn^{2+}$ and a boron-containing alkoxide compound, such as $B(OC_2H_5)_3$, or organometallic compound, such as $B(C_5H_7O_2)_3$, in an alcoholic solution. Through the hydrolysis, the surface of a phosphor particle is uniformly coated with $B_2O_3$ in a thickness of 5-20 nm. As the next step, bake the phosphor particles at 500-900° C. in the air. In this way, the amount of charge of the phosphor can be approximated to zero. According to differences in amount of charge of phosphors to be prepared, the thickness of the coating material ($B_2O_3$) and/or the baking temperature can be increased or decreased to obtain an amount of charge close to zero.

It will be understood that the control method of amount of charge by employing a compound having an amount of charge of substantially zero as a coating material is also applicable to other phosphor materials.

EXPERIMENT

In order to evaluate the performance of a plasma display unit of the present invention, samples based on the first and second embodiments were prepared to carry out performance evaluation tests. Each of the plasma display units produced as samples has a diagonal size of 42 in. for a high definition (HD) TV screen having a rib-pitch of 150 μm. Each of the PDP was produced so that the dielectric glass layer was 20 μm thick; the MgO protective layer was 0.5 μm thick; and the distance between each display electrode and each display scan electrode was 0.08 mm. The discharge space was filled with a discharge gas in which 5% of xenon gas was mixed with neon as the major component. The discharge gas was sealed in the discharge space with the application of specified discharging gas pressure of, for example, 66.5 kPa.

Table 1 shows the composition of each phosphor sample used for evaluation of a plasma display unit and compounds for controlling amount of charge mixed into the phosphor samples.

TABLE 1

| | Green phosphor $xBaO•yAl_2O_3•zMnO•bMO$ | | | | | Blue phosphor $[(1-x)BaO•xEuO•MgO•5Al_2O_3•bMO]$ | | | Red phosphor $[x(Y, Gd)_2O_3.yEu_2O_3•B_2O_3•bMO]$ | | | |
|---|---|---|---|---|---|---|---|---|---|---|---|---|
| | | | | | MO | | | MO | | | | |
| Sample No. | Amount of BaO x | Amount of y | Amount of z | Amount of b | (material and applying method) | Amount of Eu x | Amount of b | (material and applying method) | x | Y | b | MO (material and applying method) |
| 1 | 1 | 5.00 | 0.3 | 0.1 | $Sb_2O_5$ added | 0.10 | 0.1 | $B_2O_3$ added | 0.8 | 0.2 | 0.1 | $MoO_3$ added |
| 2 | 0.75 | 6.00 | 0.2 | 0.05 | $B_2O_3$ coating | x = 0.2 | 0.05 | $Nb_2O_5$ coating | 0.9 | 0.1 | 0.05 | $GeO_2$ coating |
| 3 | 0.8 | 5.50 | 0.4 | 0.01 | $TiO_2$ added | x = 0.3 | 0.01 | $Ta_2O_5$ coating | 0.85 | 0.15 | 0.01 | $ZrO_2$ coating |
| 4 | 0.9 | 6.00 | 0.25 | 0.03 | $V_2O_5$ added | x = 0.15 | 0.03 | $SnO_2$ coating | 0.75 | 0.25 | 0.03 | $SiO_2$ coating |

TABLE 1-continued

| | Green phosphor | | | | Blue phosphor [(1 − x)(Ba,Sr)O•xEuO•MgO•5Al$_2$O$_3$•bMO] | | | Red phosphor [xY$_2$O$_3$•yEu$_2$O$_3$•B$_2$O$_3$•bMO] | | | |
|---|---|---|---|---|---|---|---|---|---|---|---|
| | 2(1 − x)ZnO•2xMnO•ySiO$_2$•bMO | | | | | | MO | | | | |
| Sample No. | Amount of x | Amount of y | Amount of b | MO (material and applying method) | Amount of Eu x | Amount of b | MO (material and applying method) | x | Y | b | MO (material and applying method) |
| 5 | 0.1 | 0.90 | 0.05 | Al$_2$O$_3$ coating | 0.10 | 0.1 | Sb$_2$O$_3$ added | 0.9 | 0.1 | 0.03 | ZrO$_2$ coating |
| 6 | 0.15 | 0.80 | 0.1 | ZnO added | 0.20 | 0.05 | Nb$_2$O$_5$ coating | 0.85 | 0.15 | 0.01 | GeO$_2$ coating |
| 7 | 0.2 | 0.70 | 0.01 | Y$_2$O$_3$ coating | 0.15 | 0.01 | SnO$_2$ coating | 0.8 | 0.2 | 0.1 | B$_2$O$_3$ added |
| 8 | 0.25 | 0.60 | 0.02 | Bi$_2$O$_3$ coating | 0.20 | 0.03 | MoO$_2$ added | 0.75 | 0.25 | 0.05 | Nb$_2$O$_3$ coating |
| 9 | 0.15 | 0.80 | 0.05 | MgO added | 0.15 | 0.02 | SiO$_2$ coating | 0.70 | 0.30 | 0.06 | SnO$_4$ coating |

| | Green phosphor mixture of xBaO•yAl$_2$O$_3$•zMnO•bMO and x(Y, Gd)$_2$O$_3$•yTb$_2$O$_3$•B$_2$O$_3$•bMO (mixing ratio 45:55) | | | | | Blue phosphor (1 − x)BaO•xEuO•MgO•5Al$_2$O$_3$•bMO | | Red phosphor xY$_2$O$_3$•yE$_2$O$_3$•bMO | | | |
|---|---|---|---|---|---|---|---|---|---|---|---|
| Sample No. | Amount of x | Amount of y | Amount of z | Amount of b | MO (material and applying method) | Amount of Eu x | Amount of b | MO (material and applying method) | x | Y | b | MO (material and applying method) |
| 10 | BaOx = 1.0 (Y,Gd)x = 0.9 | Al$_2$O$_3$y = 6 Tb2O3y = 0.1 | MnOz = 0.25 | 0.02 | GeO$_2$ coating | 0.1 | 0.02 | GeO$_2$ added | 0.9 | 0.1 | 0.03 | Sb$_2$O$_3$ added |
| 11 | BaOx = 0.9 (Y,Gd)x = 0.8 | Al$_2$O$_3$y = 6 Tb2O3y = 0.2 | MnOz = 0.25 | 0.03 | B$_2$O$_3$ coating | 0.1 | 0.03 | B$_2$O$_3$ coating | 0.85 | 0.15 | 0.04 | B$_2$O$_3$ added |
| 12 | BaOx = 0.8 (Y,Gd)x = 0.7 | Al$_2$O$_3$y = 5.5 Tb2O3y = 0.3 | MnOz = 0.3 | 0.04 | Nb$_2$O$_3$ coating | 0.1 | 0.04 | Nb$_2$O$_3$ coating | 0.75 | 0.2 | 0.05 | Nb$_2$O$_3$ added |
| 13* | Green phosphor 1.8Zn•0.2MnO•SiO$_2$ (x = 0.1, b = 0) | | | | | Blue phosphor 0.9BaO•MgO•0.1EuO•5Al$_2$O$_3$ (x = 0.1, b = 0) | | Red phosphor 0.8(Y, Gd)$_2$O$_3$•B$_2$O$_3$•0.2Eu$_2$O$_3$ (x = 0.8, y = 0.2, b = 0) | | | |
| 14* | Green phosphor mixture of 0.8(Y, Gd)$_2$O$_3$•0.2Tb$_2$O$_3$•B$_2$O$_3$ and 1.8Zn•0.2MnO•SiO$_4$ (mixinig ratio 50:50) amount of charge: 0.015 μC/g | | | | | Blue phosphor 0.9BaO•MgO•0.1EuO•5Al$_2$O$_3$ (x = 0.1, b = 0) | | Red phosphor 0.8(Y, Gd)$_2$O$_3$•B$_2$O$_3$•0.2Eu$_2$O$_3$ (x = 0.8, y = 0.2, b = 0) | | | |
| 15* | Green phosphor mixture of 0.8(Y, Gd)$_2$O$_3$•0.2Tb$_2$O$_3$•B$_2$O$_3$ and 1.8Zn•0.2MnO•SiO$_4$ (mixinig ratio 50:50) amount of charge: 0.015 μC/g | | | | | mixture of the blue phosphor of sample 13* and Nb$_2$O$_3$ (amount of Nb$_2$O$_3$: 2%) | | mixture of the red phosphor of sample 13* and SiO$_2$ (amount of SiO$_2$: 1.5%) | | | |

*Samples 13* through 15* are comparative examples.

Samples 1 through 4 are structured so as to have a combination of the green phosphor of [xBaO.yAl$_2$O$_3$.zMnO.bMO], the blue phosphor of [(1-x)BaO.x/2Eu$_2$O$_3$.MgO.5Al$_2$O$_3$.bMO], and the red phosphor of [x(Y, Gd)$_2$O$_3$.yEu$_2$O$_3$.B$_2$O$_3$.bMO (where, Y:Gd=65:35)]. The amount of charge of all the phosphors of the aforementioned samples, as shown in Table 2, achieves within ±0.01 μC/g.

Samples 5 through 9 are structured so as to have a combination of the green phosphor of [2(1-x)ZnO.2xMnO.ySiO$_2$.bMO], the blue phosphor of [(1-x)(Ba,Sr)O.x/2Eu$_2$O$_3$.MgO.5Al$_2$O$_3$.bMO (where, Ba:Sr=80:20)], and the red phosphor of [xY$_2$O$_3$yEu$_2$O$_3$.B$_2$O$_3$.bMO]. The amount of charge of all the phosphors of the aforementioned samples, as shown in Table 2, achieves within ±0.01 μC/g.

Samples 10 through 12 are structured so as to have a combination of two kinds of green phosphors of [xBaO.yAl$_2$O$_3$.zMnO.bMO] and [x(Y, Gd)$_2$O$_3$.B$_2$O$_3$.yTb$_2$O$_3$.bMO (where, Y:Gd=50:50)] in a mixing ratio of [xBaO.yAl$_2$O$_3$.zMnO.bMO]: [x(Y, Gd)$_2$O$_3$.B$_2$O$_3$.yTb$_2$O$_3$.bMO]=45:55, the blue phosphor of [(1-x)BaO.x/2Eu$_2$O$_3$.MgO.5Al$_2$O$_3$.bMO], and the red phosphor of [xY$_2$O$_3$.yEu$_2$O$_3$.bMO]. The amount of charge of all the phosphors of the aforementioned samples, as shown in Table 2, achieves within ±0.01 μC/g.

Samples 13*, 14*, and 15* are prepared as comparative samples. The comparative samples are formed of combination of conventional phosphors of three colors, each of which consists of main materials, that is, each of which is given no improvement in amount of charge. Sample 13* has following combination: a conventional green phosphor of [1,8ZnO.0.2MnO.SiO$_2$ (where, x=0.1, y=1, b=0)] having an amount of charge of −1.5 μC/g; a conventional blue phosphor of [0.9BaO.MgO.0.1EuO.5Al$_2$O$_3$ (x=0.1, b=0)] having an amount of charge of +1.2 μC/g; and a conventional red phosphor of [0.8(Y, Gd)$_2$O$_3$.B$_2$O$_3$.0.2Eu$_2$O$_3$.bMO (x=0.8, y=0.21, b=0, and Y:Gd=65; 35)] having an amount of charge of +1.1 μC/g.

The green phosphor employed for sample 14* consists of 50% of [0.8(Y, Gd)$_2$O$_3$.B$_2$O$_3$.0.2Tb$_2$O$_3$ (where, Y:Gd=50: 50)] having an amount of charge of +1.4 μC/g; and 50% of [Zn$_2$SiO$_4$:Mn$^{2+}$] having an amount of charge of −1.5 μC/g, so that the apparent amount of charge of +0.015 μC/g is obtained. As for the blue phosphor and the red phosphor, [Ba1-xMgAl$_{10}$O$_{17}$:Eu$_x^{2+}$] having an amount of charge of +1.3 μC/g and [(Y, Gd)BO$_3$:Eu$^{3+}$] having an amount of charge of +1.1 μC/g are used, respectively.

The green phosphor of sample 15* has the same composition as that of sample 14*. As for the blue phosphor and the red phosphor, an oxide is added to each phosphor employed for sample 14*; the blue phosphor is prepared in such a way that Nb$_2$O$_3$ bearing negative (−) charge is mixed (where, the mixing ratio of Nb$_2$O$_3$ is 3%) into the blue phosphor of [0.9BaO.MgO.0.1EuO.5Al$_2$O$_3$ (x=0.1, b=0)] with an amount of charge of +1.2 μC/g, so that the apparent amount of charge is controlled to +0.002 μC/g. Similarly, the red phosphor is prepared in such a way that compound SiO$_2$ bearing negative (−) charge is mixed (where, the mixing ratio of SiO$_2$ is 1.5%) into the red phosphor of [(Y, Gd)BO$_3$:Eu$^{3+}$] with an amount of charge of +1.1 μC/g, so that the apparent amount of charge is controlled to −0.003 μC/g.

Evaluation Experiment 1

The inventors examined the amount of charge of each phosphor of samples 1 through 12, and comparative samples 13*, 14*, and 15* with a blow-off charge measuring device. The result tells that the amount of charge of all the phosphors employed for samples 1 through 12 are settled within ±0.01 μC/g.

Evaluation Experiment 2

The luminance degradation of each phosphor and of the panel displaying white was tested as follows. Discharge sustain pulses at a voltage of 185V and at a frequency of 200 kHz were applied to each sample PDP continuously for 1000 hours, and luminance of each PDP was measured before and after the application of the pulses. Based on the measurements, the luminance degradation factor was derived from the expression of ((luminance after pulse-application−luminance before pulse-application)/luminance before pulse-application)*100. Addressing failure at address discharge was determined by existence of flickers in an image. If a sample PDP has flickers in any one position, the PDP was judged as having flickers.

Evaluation Experiment 3

Green phosphor ink was applied through a nozzle with a diameter of 100 μm continuously for 100 hours. After that, evaluations were given on the absence or presence of a clogged nozzle, of inconsistencies in phosphor coat (after dried), and of improper alignment of color while responsible discharge cells are turning ON.

The results obtained from the evaluation experiments 1 through 3 the luminance degradation of the each panel displaying white, the luminance degradation of each phosphor, the absence or presence of inconsistencies in coating; improper alignment of color; addressing failure at address discharge; a clogged nozzle—are listed in Table 2.

TABLE 2

| Sample No. | Amount of charge of phosphor (μC/g) | | | Luminance degradation factor (%) of panel after the application of discharge sustain pulses (185 V, 200 kHz) for 1000 hrs. at displaying all white | Luminance degradation factor (%) of each phosphor after the application of discharge sustain pulses (185 V, 200 kHz) for 1000 hrs. | | | Inconsistencies in coating of panel and improper alignment of color | Addressing failure at address discharge and clogged nozzle |
|---|---|---|---|---|---|---|---|---|---|
| | Green | Blue | Red | | Green | Blue | Red | | |
| 1 | −0.005 | −0.006 | −0.008 | −2.4 | −2.1 | −0.6 | 0.1 | None | Both none |
| 2 | −0.009 | 0.001 | 0.003 | −2.5 | −2.3 | −0.5 | 0.2 | None | Both none |
| 3 | 0.007 | 0.009 | 0.01 | −2.5 | −2.1 | −0.7 | −0.2 | None | Both none |
| 4 | 0 | −0.005 | 0.006 | −1.7 | −1.0 | −0.6 | 0.4 | None | Both none |
| 5 | −0.01 | −0.007 | 0.008 | −2.9 | −2.5 | −0.8 | 0.5 | None | Both none |
| 6 | 0.008 | 0.002 | 0.01 | −2.7 | −2.3 | −1.0 | −0.3 | None | Both none |
| 7 | −0.008 | 0.003 | 0 | −2.5 | −2.1 | −0.7 | 0.1 | None | Both none |
| 8 | 0.01 | 0.001 | 0.006 | −2.8 | −2.7 | −0.5 | −0.3 | None | Both none |
| 9 | −0.009 | −0.002 | 0.002 | −2.7 | −2.4 | −0.6 | 0.2 | None | Both none |
| 10 | 0.006 | 0.01 | 0.009 | −2.7 | −2.3 | −0.9 | −1.0 | None | Both none |
| 11 | 0 | 0.007 | 0.001 | −1.5 | −1 | −0.6 | 0.3 | None | Both none |
| 12 | 0.002 | 0.005 | 0.005 | −2.2 | −1.9 | −0.6 | 0.4 | None | Both none |
| 13* | −1.5 | 1.2 | 1.1 | −15.8 | −14.8 | −3.5 | −3.5 | Observed | Both observed |
| 14* | 0.015 | 1.3 | 1.1 | −13.6 | −12.5 | −3 | −4 | Observed | Both observed |

TABLE 2-continued

| Sample No. | Amount of charge of phosphor ($\mu$C/g) | | | Luminance degradation factor (%) of panel after the application of discharge sustain pulses (185 V, 200 kHz) for 1000 hrs. at displaying all white | Luminance degradation factor (%) of each phosphor after the application of discharge sustain pulses (185 V, 200 kHz) for 1000 hrs. | | | Inconsistencies in coating of panel and improper alignment of color | Addressing failure at address discharge and clogged nozzle |
|---|---|---|---|---|---|---|---|---|---|
| | Green | Blue | Red | | Green | Blue | Red | | |
| 15* | 0.015 | 0.002 | −0.003 | −15.8 | −14.3 | −1.0 | 0.2 | No inconsistency in coating | No clogged nozzle, but addressing failure was observed |

*Samples 13*, 14*, and 15* are comparative samples.

Comparative samples 13*, 14*, and 15* are formed of combination of conventionally employed phosphors. As shown in Table 2, the amount of charge of each comparative sample is more than 100 times the amount of charge of the phosphor of samples 1 through 12. Because of such a large amount of charge, application of the phosphor ink easily invites inconsistencies in color or improper color mixing due to inconsistencies in coating by friction caused when the ink passes through a narrow nozzle. Besides, the phosphor easily absorbs water or hydrocarbon-based gas. This fact considerably degrades the luminance of each phosphor, thereby producing misalignment of color, accordingly, the luminance when the panel displays white is significantly impaired.

On the other hand, the phosphors of samples 1 through 12 have an amount of charge close to zero. Therefore, the luminance in discharging is properly maintained. Besides, none of addressing failure at address discharge, a clogged nozzle, and misalignment of color was observed.

Comparative sample 14* employs the phosphor of $Zn_2SiO_4:Mn^{2+}$ bearing noticeable negative (−) charge and the phosphor of $(Y, Gd)BO_3:Tb^{3+}$ bearing noticeable positive (+) charge to form the green phosphor. The two kinds of phosphors are simply mixed with each other to obtain the green phosphor having apparent amount of charge of 0.015 $\mu$C/g. Although the apparent amount of charge is close to zero, each phosphor particle forming the green phosphor have large amount of charge, thereby the particles easily capture water, carbon monoxide (CO), carbon dioxide ($CO_2$), or hydrocarbon-based gases. This fact means increase in undesired gas emission when the panel is in operation, so that 147 nm-ultraviolet lays and discharge sustain pulses contribute to luminance degradation. Furthermore, addressing failure and a clogged nozzle easily occur.

In comparative sample 15*, each of the three phosphors has an amount of charge as low as those of samples 1 through 12; there is little worry about inconsistency in coating or a clogged nozzle. However, suppressing the amount of charge relatively low by simple mixing (i.e., without chemical bonding) cannot expect to decrease the gas absorption by the phosphor particles, thereby exhibiting luminance degradation by discharging.

In contrast, in the PDPs employing the combination of the green, blue, and red phosphors of samples 1 through 12, the oxides added or coated to each phosphor experience a baking process at high temperatures, so that the oxide and the phosphor are chemically bonded. The amount of charge of the surface of a phosphor particle is therefore kept close to zero, whereby impurity gases are hard to be captured by the phosphor. Accordingly, luminance degradation of each color by 147 nm-Ultraviolet rays or discharge sustain pulses, and changes in temperature of the color are minimized. These advantages contribute to an improved luminance when a panel displays white. Besides, neither addressing failure nor a clogged nozzle in applying phosphors occurs.

INDUSTRIAL APPLICABILITY

According to the present invention, a phosphor conventionally used for a plasma display unit, which bears positive or negative charge, is coated with a compound for controlling the amount of charge of the phosphor through a strong chemical bonding, whereby the amount of charge of a phosphor can be suppressed within ±0.01 $\mu$C/g. Controlling the amount of charge of phosphors close to zero can keep impurity gases away from the phosphor particle when the panel is in operation, suppressing problems critical to driving a plasma display unit, such as luminance degradation of phosphors, improper color alignment of images in panel operation, luminance degradation when the panel displays all white, and inconsistencies in applying phosphors. A high quality plasma display unit can be thus obtained.

The invention claimed is:
1. A plasma display unit comprising:
a front panel having a plurality of display electrode pairs disposed on a glass substrate;
a rear panel in a confronting arrangement via discharge space, having a plurality of address electrodes that forms discharge cells in combination with the display electrode pairs; and
a phosphor layer for emitting by discharging, comprising
a main material including a first oxide, and
a second oxide containing an element with electronegativity larger than the oxide included in the main material;
wherein
the surface of the phosphor layer would bear a positive (+) charge if the phosphor layer were formed without the second oxide, the second oxide is added such that the absolute value of the charge of the phosphor layer does not exceed 0.01 μC/g, and the main material including the first oxide is formed of an aluminate-based green phosphor of $BaAl_{12}O_{19}:Mn^{2+}$.

2. The plasma display unit of claim 1, wherein the second oxide containing an element with electronegativity larger than the oxide included in the main material is at least any one of titanium oxide ($TiO_2$); tin oxide ($SnO_2$); germanium oxide ($GeO_2$); tantalum oxide ($Ta_2O_5$) ($Ta_2O_5$); niobium oxide ($Nb_2O_5$); vanadium oxide ($V_2O_5$); molybdenum oxide ($MoO_3$); boron oxide ($B_2O_3$); silicon oxide ($SiO_2$); and antimony oxide ($Sb_2O_3$).

3. The plasma display unit of claim 2, wherein the phosphor layer is formed by mixing $xBaO.yAl_2O_3.zMnO.bMO$ with the relationship $0.75 \leq x \leq 1.0$, $5.0 \leq y \leq 6.0$, $0.2 \leq z \leq 04$ and $0.01 \leq b \leq 0.1$.

4. A plasma display unit comprising:
a front panel having a plurality of display electrode pairs disposed on a glass substrate;
a rear panel in a confronting arrangement via discharge space, having a plurality of address electrodes that forms discharge cells in combination with the display electrode pairs; and
a phosphor layer for emitting by discharging, comprising a main material including a first oxide, and
a second oxide containing an element with electronegativity larger than the oxide included in the main material; wherein
the surface of the phosphor layer would bear a positive (+) charge if the phosphor layer were formed without the second oxide,
the second oxide is added such that the absolute value of the charge of the phosphor layer does not exceed 0.01 μC/g, and
the main material including the first oxide is formed of a yttrium oxide-based green phosphor of $(Y, Gd)BO_3:Tb^{3+}$.

5. The plasma display unit of claim 4, wherein the second oxide (MO) containing an element with electronegativity larger than the oxide included in the main material is at least any one of titanium oxide ($TiO_2$); tin oxide ($SnO_2$); germanium oxide ($GeO_2$); tantalum oxide ($Ta_2O_5$); niobium oxide ($Nb_2O_5$); vanadium oxide ($V_2O_5$); molybdenum oxide ($MoO_3$); boron oxide ($B_2O_3$); silicon oxide ($SiO_2$); and antimony oxide ($Sb_2O_3$).

6. The plasma display unit of claim 5, wherein the phosphor layer is formed by mixing $(1-x-y)Y_2O_3.xGd_2O_3.B_2O_3.yTb_2O_3.bMO$ with the relationship $0 \leq x \leq 0.5$, $0.05 \leq y \leq 0.3$, and $0.01 \leq b \leq 0.1$.

7. A plasma display unit comprising:
a front panel having a plurality of display electrode pairs disposed on a glass substrate;
a rear panel in a confronting arrangement via discharge space, having a plurality of address electrodes that forms discharge cells in combination with the display electrode pairs; and
a phosphor layer for emitting by discharging, comprising a main material including a first oxide, and
a second oxide containing an element with electronegativity larger than the oxide included in the main material; wherein
the surface of the phosphor layer would bear a positive (+) charge if the phosphor layer were formed without the second oxide, the second oxide is added such that the absolute value of the charge of the phosphor layer does not exceed 0.01 μC/g, and the main material including the first oxide is formed of a yttrium oxide-based red phosphor of $(Y, Gd)BO_3:Eu^{3+}$ or $Y_2O_3:Eu^{3+}$.

8. The plasma display unit of claim 7, wherein the second oxide (MO) containing an element with electronegativity larger than the oxide included in the main material is at least any one of tin oxide ($SnO_2$); germanium oxide ($GeO_2$); tantalum oxide ($Ta_2O_5$); niobium oxide ($Nb_2O_5$); vanadium oxide ($V_2O_5$); molybdenum oxide ($MoO_3$); and antimony oxide ($Sb_2O_3$).

9. The plasma display unit of claim 8, wherein the phosphor layer is formed by mixing $xY_2O_3.yEu_2O_3.bMO$ with the relationship $0.75 \leq x \leq 0.9$, $0.1 \leq y \leq 0.2$, and $0.03 \leq b \leq 0.05$.

10. A phosphor comprising:
a main material including a first oxide, and
a second oxide containing an element with electronegativity larger than the oxide included in the main material; wherein
the surface of the phosphor would bear a positive (+) charge if the phosphor were formed without the second oxide, and
the second oxide is added such that the absolute value of the charge of the phosphor does not exceed 0.01 μC/g, wherein the main material including the first oxide is formed of an aluminate-based green phosphor of $BaAl_{12}O_{19}:Mn^{2+}$.

11. The phosphor of claim 10, wherein the second oxide (MO) containing an element with electronegativity larger than the oxide included in the main material is at least any one of titanium oxide ($TiO_2$); tin oxide ($SnO_2$); germanium oxide ($GeO_2$); tantalum oxide ($Ta_2O_5$); niobium oxide ($Nb_2O_5$); vanadium oxide ($V_2O_5$); molybdenum oxide ($MoO_3$); boron oxide ($B_2O_3$); silicon oxide ($SiO_2$); and antimony oxide ($Sb_2O_3$).

12. The phosphor of claim 11, wherein the phosphor layer is formed by mixing $xBaO.yAl_2O_3.zMnO.bMO$ with the relationship $0.75 \leq x \leq 1.0$, $5.0 \leq y \leq 6.0$, $0.2 \leq z \leq 0.4$, and $0.01 \leq b \leq 0.1$.

13. A phosphor comprising:
a main material including a first oxide, and
a second oxide containing an element with electronegativity larger than the oxide included in the main material; wherein
the surface of the phosphor would bear a positive (+) charge if the phosphor were formed without the second oxide, and
the second oxide is added such that the absolute value of the charge of the phosphor does not exceed 0.01 μC/g, wherein the main material including the first oxide is formed of a yttrium oxide-based green phosphor of $(Y, Gd)BO_3:Tb^{3+}$.

14. The phosphor of claim 13, wherein the second oxide (MO) containing an element with electronegativity larger than the oxide included in the main material is at least any one of titanium oxide ($TiO_2$); tin oxide ($SnO_2$); germanium oxide ($GeO_2$); tantalum oxide ($Ta_2O_5$); niobium oxide ($Nb_2O_5$); vanadium oxide ($V_2O_5$); molybdenum oxide ($MoO_3$); boron oxide ($B_2O_3$); silicon oxide ($SiO_2$); and antimony oxide ($Sb_2O_3$).

15. The phosphor of claim 14, wherein the phosphor layer is formed by mixing $(1-x-y)Y_2O_3.xGd_2O_3.B_2O_3.yTb_2O_3.bMO$ with the relationship $0 \leq x \leq 0.5$, $0.05 \leq y \leq 0.3$, and $0.01 \leq b \leq 0.1$.

* * * * *